(12) United States Patent
Obrador et al.

(10) Patent No.: US 8,660,342 B2
(45) Date of Patent: Feb. 25, 2014

(54) METHOD TO ASSESS AESTHETIC QUALITY OF PHOTOGRAPHS

(75) Inventors: Pere Obrador, Madrid (ES); Michele Saad, Madrid (ES); Poonam Suryanarayan, Madrid (ES); Nuria Oliver, Madrid (ES)

(73) Assignee: Telefonica, S.A., Madrid (ES)

( * ) Notice: Subject to any disclaimer, the term of this patent is extended or adjusted under 35 U.S.C. 154(b) by 86 days.

(21) Appl. No.: 13/356,846

(22) Filed: Jan. 24, 2012

(65) Prior Publication Data
US 2013/0188866 A1 Jul. 25, 2013

(51) Int. Cl.
*G06K 9/34* (2006.01)

(52) U.S. Cl.
USPC ............................ 382/164; 162/165; 162/224

(58) Field of Classification Search
USPC ................. 382/112, 162, 164, 165, 195, 224; 283/2; 229/70, 928; 396/242, 290; 358/1.2; 348/207.1, E5.024
See application file for complete search history.

(56) References Cited

U.S. PATENT DOCUMENTS

| | | | | |
|---|---|---|---|---|
| 4,751,542 A | * | 6/1988 | Cibils Madero | 396/242 |
| 5,280,961 A | * | 1/1994 | Rohloff | 283/2 |
| 6,748,097 B1 | * | 6/2004 | Gindele et al. | 382/112 |

* cited by examiner

*Primary Examiner* — Anh Do
(74) *Attorney, Agent, or Firm* — Sughrue Mion, PLLC (57) ABSTRACT

A method that includes classifying photographs into categories; generating computational models of image aesthetics, each computational model of image aesthetics associated to one different category of the categories; extracting a plurality of features from a photograph, the plurality of features including simplicity features, global features computed in the whole image and/or low-level features in contrasting regions of an image of the photograph, the contrasting regions being partitions of the image obtained by applying an image segmentation algorithm based on feature contrast to the photograph; and applying a computational model of image aesthetics to at least part of the plurality of features extracted from the photograph, the computational model applied according to the category of the photograph, in order to assess aesthetic quality of the photograph.

23 Claims, 4 Drawing Sheets

METHOD TO ASSESS AESTHETIC QUALITY OF PHOTOGRAPHS

FIELD OF THE ART

The present invention generally relates to a method to assess aesthetic quality of photographs and more particularly to a method that comprises a) classifying photographs into categories, b) generating computational models of image aesthetics, each computational model of image aesthetics associated to one different category of said categories, c) extracting a plurality of features from a photograph, said plurality of features being simplicity features, global features computed in the whole image and/or low-level features in contrasting regions of an image of said photograph, said contrasting regions being partitions of said image obtained by applying an image segmentation algorithm based on feature contrast to said photograph and d) applying a computational model of image aesthetids to at least part of said plurality of features extracted from said photograph, said computational model applied according to the category of said photograph, in order to assess aesthetic quality of said photograph.

PRIOR STATE OF THE ART

We live in a multimedia-rich world, where the ubiquity of camera-phones and digital cameras, combined with increasingly popular photo-sharing websites (e.g. Flickr, Photobucket, BlueMelon, PicasaWeb) and online social networks (e.g. Facebook, MySpace) result in billions of consumer photographs available the web, as well as in personal photo repositories. In this scenario, computational approaches to automatically assess the aesthetic value of photographs are becoming increasingly important to, for instance, enable novel automatic photo story-telling applications [15] [22] and scene summarization algorithms [26] [34], and complement existing re-ranking approaches to image search and retrieval [9] [13]. The ultimate goal of computational aesthetics is to accurately predict the aesthetic value of photographs, enabling the selection of images that would be rated as aesthetically appealing by humans, or conversely, the rejection of images that would be deemed aesthetically unappealing.

In the world of photography, the term aesthetics refers to the concept of appreciation and judgement of beauty and taste in photographic images, which is generally a subjective measure, highly dependent on image content and personal preferences. There is no universally agreed upon objective measure of aesthetics. Hence, the problem of automatic image aesthetic assessment is an extremely challenging task. However, despite this major challenge, photographic theory [14] proposes a set of rules, regarding composition, exposure, contrast, and color harmony, etc., which seem to generate appealing images for humans in general.

Philosophers have tried for a long time to unify the aesthetic judgements across different categories of objects [23],—i.e., a house vs. a sunset vs. a horse—or across different art forms—i.e., music vs. painting—even though they have suggested that each art form and object category has their own language for the judgement of aesthetics [17]. The same reasoning can apply to different photographic categories, where there may be common criteria that apply across categories, but each photo category may also have its own intrinsic aesthetic criteria. Consequently, is not a surprise that new aesthetic photo categories are introduced regularly in the aesthetics community in order to understand the criteria that work best for each new category [4].

Aesthetic factors have been shown to play an important role in image search and organization. For instance, Choi et al. [7] explored factors—beyond tag semantics—that play a role in an image search task. In a user study of an image retrieval system (the American memory photo archives of the Library of Congress), it was observed that users valued image quality and clarity—i.e., parameters of image aesthetics—in addition to the image semantics. Hence, the research community has recently proposed image search re-ranking algorithms that use aesthetics with improved results [25] [28]. Even though different categories are usually judged very differently by observers—i.e., taking into account different low level features [1]—little research has been devoted to date to explore the role that image content plays on the aesthetic value of photographs.

The field of image aesthetics assessment has recently gained attention as a result of the ubiquity of digital visual information and related applications. Datta et al. [10] propose an algorithm for classifying images into one of two aesthetics categories: high versus low, with an accuracy of 70.12% on the photo.net [20] image corpus, which contains image aesthetics ratings in the range 1 to 7.

Ke et al. [25] classify images into professional photos versus snapshots with a classification accuracy of 72% after extracting a (bag of photo quality features) from images crawled from DPChallenge.com. A Naive Bayes classifier was used for classification.

Wong et al. in [36] proposed a saliency region extraction method to classify images into 2 classes: professional photos versus snapshots. The approach emphasizes the features extracted from the salient regions of the image. The method achieved a 78.8% classification accuracy based on an SVM classifier. The experiments were conducted on a set of images collected from photo.net [20].

Cerosaletti et al. [6] showed that the best high level categorization regarding aesthetics is usually obtained by partitioning the set into people and non-people photos. This has triggered some work in the area of aesthetics of photos with faces. For instance, Obrador et al. [2] proposed a two-category image appeal measurement approach, consisting of generic image aesthetics and face aesthetics. The proposed approach performs image segmentation prior to feature extraction for the generic model, and face detection for the face based model. The algorithm was tested on a set of consumer photos of varying quality, the aesthetics scores of which were obtained via a subjective study. They accomplish a linear correlation value of 0.659 between their face aesthetics model and the ground truth.

Similarly, Li et al. [27] focused on predicting aesthetics quality scores for consumer photographs with faces. The dataset of images with ratings was obtained after conducting a subjective study. The algorithm extracts image features from the face region of an image. The algorithm classifies an image into one of 5 classes of aesthetic ratings using an SVM classification model with 68% accuracy. Additionally, the authors carried out a linear and SVM regression on the collected ground truth, achieving only up to a 25% improvement over random score prediction.

Recently, Bhattacahrya et al. [5] presented a system for photo enhancement, based on a two category image composition aesthetic analysis: one category is related to outdoor photographic compositions with a single foreground object; in this category they apply the rule of thirds for the positioning of the foreground object. The second category relates to landscapes and seascapes that lack a dominant object, and in this second category they apply the golden mean for the positioning of the horizon.

One can infer from the results in the literature that the task of predicting image aesthetic appeal is non-trivial and still an open research topic. One reason is that a non-negligible component of our human judgement of aesthetics depends on the image content. In addition, a major challenge in aesthetics quality assessment is obtaining ground truth for benchmarking of the proposed algorithms. Thus far, there does not exist a standardized method for algorithm evaluation, nor there exists a standard database of images with reliably collected subjective scores of human judgements of aesthetics quality. This makes the comparison of algorithms a challenging task.

Finally, each of the approaches described above has its shortcomings. [36] and [25] only classify into 2 classes and do not predict a continuous score that correlates with the human judgement of aesthetics quality. [10] presents both results for classification into 2 classes and a polynomial regression, but does not take categories into account. [27] proposed a method only tailored towards images with faces, and hence the approach is not directly generalizable across all photo categories. Even though [2] proposed a two category approach, these 2 categories are not complementary, i.e., an image may have a measure of its general aesthetics, and then each face in it will have a measure of its face aesthetics. In addition, the two categories presented in [5] are not very diverse.

DESCRIPTION OF THE INVENTION

It is necessary to offer an alternative to the state of the art which covers the gaps found therein, particularly related to the lack of proposals which really allows evaluating the aesthetic of a photograph in an efficient, reliable and objective way.

To that end, the present invention provides a method to assess aesthetic quality of photographs.

On the contrary to the known proposals, the method of the invention, in a characteristic manner it comprises:
classifying photographs into categories;
generating computational models of image aesthetics, each computational model of image aesthetics associated to one different category of said categories;
extracting a plurality of features from a photograph, said plurality of features being simplicity features, global features computed in the whole image and/or low-level features in contrasting regions of an image of said photograph, said contrasting regions being partitions of said image obtained by applying an image segmentation algorithm based on feature contrast to said photograph; and
applying a computational model of image aesthetics to at least part of said plurality of features extracted from said photograph, said computational model applied according to the category of said photograph, in order to assess aesthetic quality of said photograph.

Other embodiments of the method of the invention are described according to appended claims 2 to 23 and in a subsequent section related to the detailed description of several embodiments.

BRIEF DESCRIPTION OF THE DRAWINGS

The previous and other advantages and features will be more fully understood from the following detailed description of embodiments, with reference to the attached drawings, which must be considered in an illustrative and non-limiting manner, in which.

DETAILED DESCRIPTION OF SEVERAL EMBODIMENTS

In view of all previous work, it is necessary to turn the attention to understand the importance of image content in the characterization of image aesthetic appeal. In this document it is proposed and experimentally validated a novel category-based approach to image aesthetic appeal prediction, which improves the results when compared to a generic model by an average of 121%. In addition, for each category the role that different image features play in defining the aesthetic appeal of the images is studied in detail.

In this document a category-dependent image aesthetics approach is presented, where each category has its own computational aesthetics model. In order to tackle this problem, a novel set of image segmentation processes based on feature contrast are introduced, such that luminance, sharpness, saliency, colour chroma, and a measure of region appeal are computed to generate different image partitions. Traditional image aesthetic features are computed in these regions (e.g. sharpness, light exposure, colorfulness). In addition, image composition, color harmony and image simplicity features are measured on the overall image. Support Vector Regression models are generated for each of 7 popular image categories: animals, architecture, cityscape, floral, landscape, portraiture and seascapes.

In order to train and evaluate computational models of image aesthetics, a set of labeled images is needed as ground truth. Ground truth is typically obtained either by means of user studies, which are very costly and typically small-scale, or by relying on labeled images available in photo-forum sites, which are easy to obtain, but tend to have noisy ratings. In this work, the latter approach was considered. The ground truth was gathered from the DPChallenge.com [21] photo-contest website, where the information about each photograph includes assigned photo categories, metadata, and comments and ratings given by its members. The average ratings in DPChallenge.com, as well as on other photo websites like photo.net, are based on a populist approach, i.e., a strong consensus can be assumed on the aesthetic appeal of a photograph if a large set of people vote on it. Hence, they are typically considered to be reliable ground truth to benchmark and objectively evaluate aesthetics assessment algorithms [10] [25] [28] [31] [36].

The image aesthetics framework of this invention is composed of a feature extraction stage, followed by an image aesthetic appeal score prediction module. The prediction results are compared with the prediction based on a state-of-the-art generic aesthetics model, i.e. the same model for all images. The category-based models of this invention improve the prediction results over a generic model that treats all images as belonging to a single generic category.

The DPChallenge image contest website [21] was chosen as the source of data for the following reasons: 1) It has image categories labeled by the photographers; 2) It provides an image count within each category. It was hence possible to determine what image categories had the largest number of photographs in order to determine which were the most dominant; 3) It has subjective photo score ratings ranging from 1 to 10, where 10 is the highest aesthetics score; 4) Each photo has metadata about how many people voted for it, which can be used as a confidence measure; and 5) it has already been used by other researchers in the literature of image aesthetics [25] [28].

A total of 320K image entries were parsed from DPChallenge.com. However, the number of images retained for the experiments was drastically reduced due to the fact that many of the images did not have enough ratings. They were only kept images that had received at least 5 ratings and were assigned to one of the semantic categories of interest, such as the most dominant in DPChallenge, while avoiding visually incoherent categories e.g. abstract, political, music, high dynamic range. The seven categories of interest were, namely, architecture, animals, cityscape, floral, landscape, portraiture, and seascapes;

The dataset was consequently reduced to 27K images. From the seven categories of interest, the seascapes category was the one with fewer images (1021). After a visual inspection process to remove all the images whose category did not apply, (noisy images, and grayscale images, since they are not representative of the consumer image segment) the process ended up with little over 300 seascape images. A similar process was performed for each category, visually inspecting the photos in each category and selecting 300 images from each. This image dataset is available to the research community.

The features extracted from each image include: (1) simplicity features; (2) global features that are computed on the whole image in a more traditional image aesthetics approach [10] [25]; and (3) a novel approach to measure low-level features in contrasting regions of the image in order to increase their discriminative power.

Note the avoidance of using high-level semantic features, such as face pose/expression [27], and also the features that require the comparison of the image at hand with the rest of the images in a certain dataset—i.e., the familiarity measure in [10]—and focus on more traditional photographic features [14] like simplicity, exposure, colorfulness, color harmony, composition, and clarity—i.e., contrast and sharpness.

Before extracting the features, an automatic frame detection algorithm was implemented—similar to that in [25]—to remove any artificial frames around the image since frames usually favour higher aesthetic ratings, and they do not appear in consumer photographs. The features are described next.

Simplicity Features

An important rule in photography is simplicity. Simplicity is attained by avoiding distracting objects and clutter that could divert the attention of the observer away from the main subject. In highly aesthetic photos, the main subject tends to be isolated from the rest of the image to be easily segmented out from the background [14]. For instance, in low depth of field images, the main subject is in good focus, i.e., sharp, whereas the rest of the image is out of focus, i.e., blurred; professional photographers also accomplish simplicity by placing their subjects in front of monochromatic backgrounds, etc.

Four measures of simplicity are used: $M_1$ to $M_4$. $M_1$ is the overall number of regions generated by the efficient graph-based image segmentation algorithm in [12]; $M_2$ and $M_3$ are the overall number of segmented regions whose size is larger than 5% and 10% of the image size, respectively (intuitively, an image that is segmented into many distinct regions cannot be a simple image); finally, $M_4$ is given by the background's homogeneity. A similar approach to [2] is used, in which an appeal map—a sharpness-dependent linear combination of the segmented region's sharpness, contrast and colorfulness maps—is thresholded at two different levels: ¼ and ¾ of the maximum.

$M_4$ is given by the normalized [0-1] distance between the centroids of the two resulting binary maps. The intuition behind this measure is that a well isolated subject from the background will generate a measure $M_4 \ll 1$, i.e., no distracting objects appear in the background when thresholding at ¼. Only images that generate binary maps that are between ⅑ and ⅔ of the image size with both thresholds are considered, otherwise $M_4 = 1$.

Global Features

A total of 38 global low-level global features are extracted from each image:

Three luminance features: the average ($\overline{L}$), the minimum ($L^m$), and the maximum luminance ($L^M$) measures;

The image root mean square contrast ($N_1$) as in [32];

Five measures of colorfulness, namely, the distance to the neutral axis ($\mu_{ab}$, a.k.a. colour chroma) of the centroid of the pixel cloud in the colour plane of CIELab colour space ($C_1$); $\sigma_{ab} = \sigma_a^2 + \sigma_b^2$, with $\sigma_a$ and $\sigma_b$ being the standard deviation of that cloud on each of the color axes ($C_2$); the D parameter as defined in [16] ($C_3$); and $\overline{M}$ as defined in [19] ($C_4$), where ($C_3$) and ($C_4$) are both a linear combination of $\mu_{ab}$ and $\sigma_{ab}$; And a colorfulness measure ($C_5$) set to 1 for $\sigma_{ab} < 10$, and set to 2 for $\sigma_{ab} > 20$, and linear with $\sigma_{ab}$ for $10 \le \sigma_{ab} \le 20$.

Seven colour harmony features, which have been found to be pleasing to the eye, and are described by their relative positions around the color wheel (Hue coordinate, in HSV colour space) [8]. These features are computed as in [30], where the normalized Hue-histogram of the image is convolved with each of 7 templates [8] (the template definitions are the same as the ones proposed in [8]; the grayscale template N-type does not apply) that represent the most used harmonious hue combinations. The correspondence between the features and their templates types is: the feature $H_1$ corresponds to template i, $H_2$ to V, $H_3$ to L, $H_4$ to I, $H_5$ to T, $H_6$ to Y, and $H_7$ to X.

Figure 1:
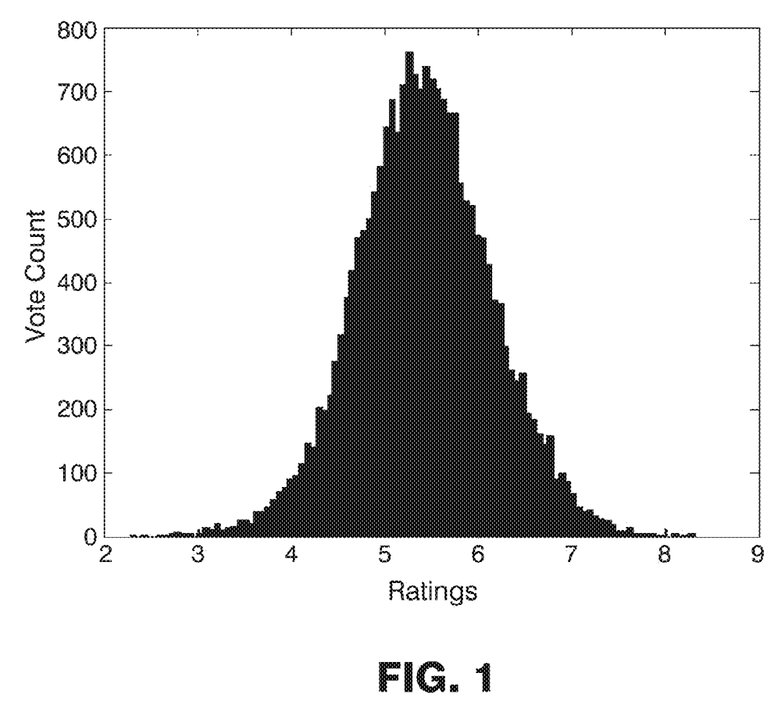
FIG. 1 shows the distribution of subjective scores in the image corpus retrieved from DPchallenge.com
Figure 2:
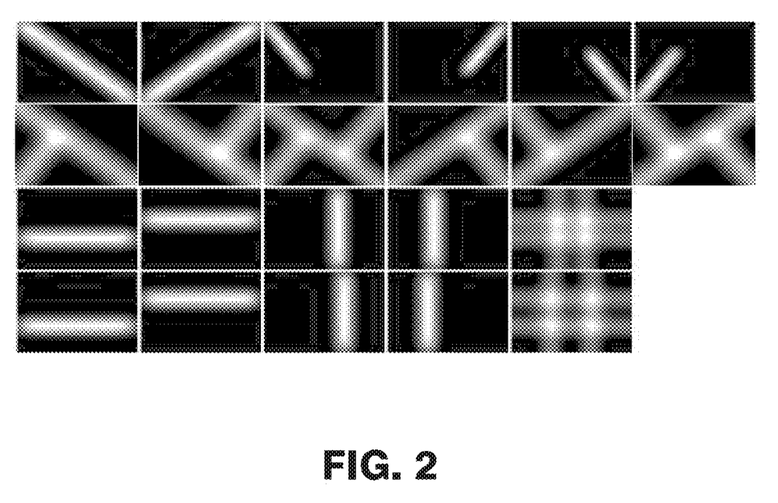
FIG. 2 shows the composition templates used to calculate part of the global features extracted from a photograph, according to an embodiment of the present invention.

Image composition features that are extracted using the templates presented in [31], which include the rule of thirds, the golden mean and the golden triangles, along with each of its individual segments, as shown in FIG. 2. Contrary to [31], instead of detecting the centroid of the image regions on those templates, the image edge map—calculated as in [29]—is intersected with each of the templates and the percentage of edge energy that they capture is extracted, $T_1$-$T_{22}$. In early experiments, it was found that these edge-based composition features provide better discriminative power than the region centroids.

Note that a global sharpness feature is not considered, since this is intrinsically a local feature (different regions will have different sharpness [25]) and the eye actually does not integrate that feature to generate a global sharpness.

In FIG. 2 they were shown the composition templates used in [31]. According to this figure, the naming convention is $T_i$, with i starting at 1 top-left, and incrementing left to right, and top to bottom, down to $T_{22}$. $T_1$-$T_6$ are the individual segments that compose the golden triangles, $T_7$-$T_{12}$ are the golden triangles and combinations; $T_{13}$-$T_{16}$ are the individual segments that compose the golden mean, with $T_{17}$ being the golden mean; and finally $T_{18}$-$T_{21}$ are the individual segments that compose the rule of thirds, with $T_{22}$ being the rule of thirds itself.

Contrasting Region Features

Another important factor that contributes to create an interesting and aesthetic photograph is the contrast or tension between features in different regions of the image [14]. The Chiaroscuro [11] photographic style is a clear example that is characterized by strong contrasts between light and dark. Low-level features calculated on each of these regions may help discriminate aesthetics in a different way, depending on which of the regions they were calculated on—i.e., high levels of sharpness in the light region of the image may be more discriminative than high levels of sharpness in the dark region of the image. As it will be shown, calculating low-level features on each of the contrasting regions improve their discriminative power over those same features calculated on the overall image (global features).

Luo et al. [28] made a first attempt at capturing features in contrasting sharpness regions. They captured the ratio of luminance and the ratio of clarity between the sharp region—i.e., the subject—and the regions that were not sharp. They did not, however, capture the features themselves, only the ratios. In [36], Wong et al. calculate a set of global features, some of which (exposure, saturation, hue, blurriness, and texture details) are also computed for both the salient—i.e., foreground—and background regions. They use global features in their approach, as well as the squared differences between the features measured in the background and in the foreground. Therefore, they only use the differences between features.

Next it will be described how the contrasting regions are calculated, followed by a description of the low-level features that are extracted from each contrasting region.

Five different types of features that can generate contrasting regions in a photograph are analysed: sharpness (F) or focus—sharp vs. non-sharp region—, luminance (L)—bright vs. dark region—, chroma (C)—colorful vs. non-colourful region—; appeal (A)—appealing vs. non-appealing region—and saliency (S)—salient vs. non-salient image region—.

Figure 3:
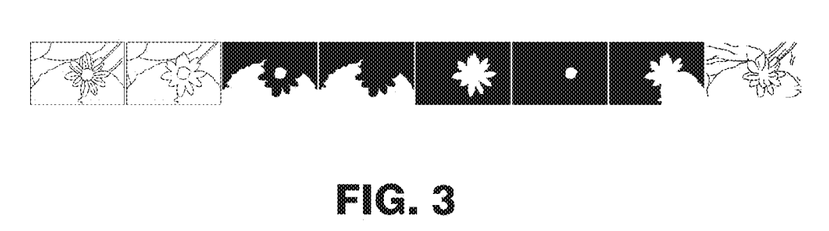
FIG. 3 shows an image with its corresponding contrasting regions (appeal, sharpness, saliency, chroma, luminance and edges), according to an embodiment of the present invention.

First, a thumbnail version of the image shown in FIG. 3—whose largest side is 128 pixels—is segmented using the algorithm in [12]. After segmentation, each segmented region is assigned a value for each of the contrasting features:

1. Sharpness F: The maximum sharpness value within the segmented region, as defined in [1];
2. Luminance L: The average luminance, in CIELab color space, over the segmented region;
3. Chroma C: $\mu_{ab}$, as described before, calculated in the segmented region;
4. Appeal A: The average appeal of the segmented region, as defined in [1]. This is a sharpness dependent, linear combination of the maximum sharpness in the segmented region, its contrast and its $\mu_{ab}$.
5. Saliency S: The maximum saliency value, which is obtained by extracting the saliency map of the image, as defined in [18]; then performing a thinning operation with a circle structuring element of diameter 21 pixels; finally the maximum of the resulting map in each segmented region is selected.

Once these segmented region-based maps are generated, they are thresholded to yield 5 binary maps as shown in FIG. 3, composed of a total of 10 regions, i.e., 5 above and 5 below the threshold. The threshold is set to one half the maximum level of each specific contrasting feature. This works better for generating these contrasting regions—i.e., the regions are more discriminative—than taking the mean or the median.

The contrasting region identifiers, $F_H$, $L_H$, $C_H$, $A_H$, and $S_H$, for the contrasting regions that are above their corresponding threshold, and $F_B$, $L_B$, $C_B$, $A_B$, and $S_B$, for the contrasting regions that are below the threshold, will be used as subscripts of each low-level feature to be calculated on those regions, as explained next.

A set of low-level features is computed on each of the ten contrasting regions.

1. Sharpness, f: Weighted average of maximum sharpness.
2. Exposure, $\bar{I}$, $I^\sigma$, $I^{Q0}$, $I^{Q1}$, $I^{Q2}$, $I^{Q3}$, $I^{Q4}$: Photographic theory explains that the real scene brightness should be rendered in a realistic manner—process known as tone mapping—in the final photograph. This means that, for certain categories, a specific luminance distribution—luminance histogram—in one of the contrasting regions may be due to a good rendition resulting in a highly aesthetic photo, or it may be due to a poor rendition and therefore result in a poor aesthetic rating—i.e., due to over or under exposure situations. Obtaining a good tone mapping for a specific photograph is therefore of paramount importance, as exemplified by the zone system proposed by Ansel Adams [3]. The luminance distribution in each region is therefore represented by a set of 7 statistical values: mean ($\bar{I}$), standard deviation ($I^\sigma$, a measure of contrast), minimum ($I^{Q0}$), 1st ($I^{Q1}$), 2nd ($I^{Q2}$) and 3rd ($I^{Q3}$), quartiles, and finally, maximum ($I^{Q4}$), in order to increase the discriminative power of the luminance distribution of the photograph.
3. Chroma, c: Weighted average of $\mu_{ab}$.
4. Saliency, s: Weighted average of maximum saliency.

The weighted average of features f, c and s is computed with respect to the segmented region size.

In the following, it is referred to each low-level feature with the subscript of the contrasting region where it has been computed. For instance, the low-level feature sharpness (f) calculated in the luminance (L) contrasting region above (H) the threshold will be denoted as $f_{LH}$.

After this process, a total of 100 contrasting region-based features are obtained. However, note that two of these features are equivalent to two global features introduced above: the maximum global luminance is the same as the maximum luminance in the high luminance contrasting region ($L^M = I_{LH}^{Q4}$), and the minimum global luminance is the same as the minimum luminance in the low luminance region ($L_m = I_{LB}^{Q0}$). Therefore these two features are removed from the pool, yielding a total of 98 contrasting region-based features.

Overall, 140 features on each image are computed: 4 simplicity features, 38 global features and 98 contrasting region-based features. The most discriminative features of this pool of 140 will be automatically selected both for the generic and the category-dependent aesthetics models, as it is described next.

Aesthetics Models 140 features are extracted from each of the images in the image corpus. The feature extraction is followed by feature selection in order to build the category-based aesthetic models, as well as the generic model.

Each of the experiments reported in this document was done using a regression Support Vector Machine, implemented using the function ksvm( ) in R (a statistical programming language [24]), and each result was averaged over 50 cross-validation runs. ksvm( ) randomizes the test/train set for each of the cross validation runs, and finds a near optimal hyper-parameter automatically by computing the median of the |x−x'| distances. We performed a grid search for the cost (v, where v is comprised between 0 and 1) and the tube width or insensitivity ($\epsilon$) parameters in a [0.1×0.1] grid, spanning from v=0.1 ... 0.9 and $\epsilon$=0.1 ... 0.9, in order to report the optimal results—.

A filter and wrapper-based approach were used for feature selection, similar to [10]. For each of the models and for each individual feature, we obtain first the 5-fold cross validation mean squared error (MSE). We keep the top 50% performing individual features—70 features—discarding the rest. We then pick the top performing feature out of those 70, followed by the feature that predicts scores the best in conjunction with the feature that was picked in the iteration before it, and so on. All of these experiments show a similar MSE pattern, with a global minimum between 9 and 34 features. The set of features corresponding to that global minimum, for each category, is the one that is finally selected to build each model.

The following table shows the performance of the aesthetics models on each categories: variance of the ratings on the entire category dataset; 5-way cross validation MSE 6 standard deviation over the 50 runs of the category dataset; % reduction of the CV MSE over the variance for the category dataset; improvement over the performance of the generic model; number of selected features that reach the 5CV MSE minimum; number of features to reach 80% reduction on the 5CV MSE over what the first selected feature—i.e., the most discriminative one—obtains; MSE reduction on one specific test set, by using the category model with respect to the generic model; WMW ranking test measure improvement on that same specific test set, by using the category model with respect to the generic model.

MSE that reduces the ratings' variance by 16.2% as shown in the table above. The top 11 features in the animals category, ordered by importance, are: $C_5$, $C_{LB}$, $C_{AB}$, $I^{Q0}_{CB}$, $C_{CH}$, $I_{SB}$, $N_1$, $I^{Q0}_{CH}$, $I_{LH}$, $T_{13}$ and $I^{Q4}_{LB}$.

Notice the strong influence that chroma features have in this model (top three features, and a total of 4 out of the 11, i.e., 4/11), both globally and in contrasting regions—dark region and non-appealing region, usually background regions. Out of the 5 selected luminance features, two of them are on the contrasting chroma regions (average and minimum luminance), showing again the importance of chroma for this category. One clarity feature and one composition feature are also selected. Finally, eight out of the 11 features are calculated on the contrasting regions, being the chroma and luminance the most discriminative contrasting regions.

Architecture Category

The category-based model for the architecture category is composed of 24 features, which accomplish a 5-way cross validation MSE that reduces the ratings variance by 14.9%, as shown in the table above. The top 13 features 5 in this category are, ordered by importance: $f_{SH}$, $M_4$, $I^{Q4}_{SH}$, $T_5$, $I°_{CB}$, $I^{Q0}_{FB}$, $M_3$, $f_{FH}$, $f_{CB}$, $I°_{CH}$, $S_{AH}$, $C_1$ and $I^{Q0}_{CB}$.

In this category, a large dominance of clarity features (6/13) has been found—the first feature is the sharpness inside the salient region, which in this case is the building itself. Simplicity features are also important (2/13)—the second feature is the background homogeneity which points out the importance of having the building well isolated from the background; followed by luminance features (3/13)—the third feature is the maximum luminance inside the salient region. One

| Category | Experiments on full datasets | | | | | | | Train/Test sets | |
|---|---|---|---|---|---|---|---|---|---|
| | $\sigma^2$ | 5CV | % Red. | Improv. | v | $\epsilon$ | #Feat. | #F. 80% | MSE reduc. | WMW improv. |
| Animals | 0.50 | 0.42 ± 2.2% | 16.2% | 102% | 0.4 | 0.1 | 22 | 11 | 11.6% | 20.7% |
| Architecture | 0.38 | 0.32 ± 2.1% | 14.9% | 86% | 0.6 | 0.7 | 24 | 13 | −8.6% | −5.4% |
| Cityscape | 0.50 | 0.39 ± 2.2% | 22.0% | 175% | 0.5 | 0.5 | 14 | 7 | 3.8% | 7.8% |
| Floral | 0.38 | 0.34 ± 2.0% | 10.5% | 31% | 0.3 | 0.1 | 6 | 6 | 0% | 0% |
| Landscape | 0.50 | 0.38 ± 2.3% | 24.4% | 205% | 0.3 | 0.5 | 28 | 19 | 4.8% | 8.6% |
| Portraiture | 0.58 | 0.51 ± 1.8% | 12.0% | 50% | 0.3 | 0.7 | 9 | 7 | −6.3% | −2.1% |
| Seascapes | 0.55 | 0.42 ± 2.4% | 24.0% | 200% | 0.7 | 0.3 | 17 | 9 | 27.3% | 11.4% |
| Generic | 0.49 | 0.45 ± 0.6% | 8.0% | — | 0.4 | 0.3 | 34 | 14 | — | — |

The models that result from these experiments are described next, with a brief discussion of the most discriminative features for each category.

The models described next have been generated with all the images from each data set—i.e., 300 images for each category, and 7×300 for the generic model. Later, in it will be presented another set of results by splitting each category dataset into training and testing sets. As mentioned above, all images in each category were visually inspected by the authors for semantic coherence, such that there is little doubt that each of the images belongs to the category that is assigned to.

In this discussion, the term clarity features will include both sharpness (f) and contrast (N and I°) features, since it helps to abstract the clarity high-level feature that humans perceive [7].

In the following paragraphs and for each of the models, they are listed the features that accomplish an 80% reduction over the MSE obtained by the most discriminative feature alone, as shown in the table above.

Animals Category

The category-based model for the animals category is composed of 22 features, which yield a 5-way cross validation composition and one chroma feature are also picked. Nine out of 13 features are calculated on the contrasting regions, being the saliency contrasting regions the most discriminative, followed by the chroma and sharpness contrasting regions.

Cityscape Category

The category-based model for the cityscape category is composed of 14 features, which accomplish a 5-way cross validation MSE that reduces the ratings variance by 22%, as shown in the table above. The top 7 features 5 are, ordered by importance: $I^{Q2}_{SB}$, $f_{LH}$, $L^m$, $T_1$, $I^{Q3}_{SH}$, $f_{FH}$ and $I^{Q2}_{SB}$.

Luminance features are predominant in this category—the first feature is the median of the luminance in the low saliency region, i.e., the background of the cityscape itself. The second feature is the sharpness in the high luminance region, which in most images it turns out to be areas of the cityscape itself, since a large percentage of the photos are taken at twilight, or against a dark blue sky. One composition feature is also picked. Five out of 7 features are calculated on the contrasting regions, being the saliency contrasting region the most discriminative.

Floral Category

The category-based model for the floral category is composed of 6 features, which accomplish a 5-way cross validation MSE that reduces the ratings variance by 10.5%, as shown in the table above. The 6 features, ordered by importance in the model are: $T_{16}$, $I^{Q0}_{LH}$, $M_2$, $T_6$, $I^{Q4}_{CB}$ and $S_{FB}$.

In this category, edge-based composition features are very important (2/6)—the first feature is the left vertical segment template for the golden mean, which implies a framing preference for positioning of flowers or stems; followed by luminance (2/6)—the second feature is the minimum luminance in the bright region, which, most of the times, it is the flower itself; and finally simplicity (1/6)—the third feature is the number of regions larger than 5% of the image size. One saliency feature is also selected. Three out of 6 features are calculated on the contrasting regions, being the luminance and chroma regions the most discriminative.

Landscape Category

The category-based model for the landscape category is composed of 28 features, which accomplish a 5-way cross validation MSE that reduces the ratings variance by 24.4%, as shown in the table above. The top 19 features 5 in the landscape category are, ordered by importance: $c_{LB}$, $L^m$, $I^{Q4}_{CB}$, $T_{14}$, $I^{Q0}_{CB}$, $T_2$, $I^{o}_{CB}$, $T_8$, $T_4$, $I_{AB}$, $T_7$, $M_2$, $I^{o}_{LH}$, $I^{Q2}_{CH}$, $M_3$, $I^{Q0}_{SH}$, $M_1$, $I^{Q0}_{FB}$ and $f_{AB}$.

The most discriminative feature is the chroma in the dark region, i.e., the non-sky regions usually with grass, rocks or trees. Luminance-based features dominate (7/19)—the second feature is the global minimum luminance level, and, actually, the minimum level of luminance has been selected 3 more times for different contrasting regions; the third feature is the maximum luminance level in the non-chromatic region. The next features in importance are the composition features (5/19)—the fourth feature is the top horizontal segment of the golden mean, which indicates one of the preferred positions for the horizon in landscape photography. Three clarity and three simplicity features are also selected. Ten out of 19 features are calculated on the contrasting regions, being the chroma contrasting regions the most discriminative, followed by appeal.

Portraiture Category

The category-based model for the portraiture category is composed of 9 features, which accomplish a 5-way cross validation MSE that reduces the ratings variance by 12%, as shown in the table above. The top 7 features 5 in this category are, ordered by importance: $H_1$, $T_2$, $I^{Q0}_{FH}$, $C_1$, $I_{CH}$, $H_4$ and $I^{Q1}_{SH}$.

Colour harmony turns out to be important in portraits (2/7)—the first feature is the analogous colour harmony feature, which means that very close hues should be the norm in the portrait. The second feature is one of the diagonals (bottom-left to top-right) of the composition templates, which favours a certain portrait pose. Finally, luminance-related features are the most important (3/7)—the third feature is the minimum luminance level in the sharp region, which is usually either the face and hair, or the eyes and teeth in softer focus portraits. Three out of the 7 features were calculated on contrasting regions, being focus the most discriminative.

Seascape Category

The category-based model for the seascapes category is composed of 17 features, which accomplish a 5-way cross validation MSE that reduces the ratings variance by 24%, as shown in the table above. The top 9 features 5 in this category are, ordered by importance: $I^{Q1}_{FH}$, $L^m$, $N_1$, $I^{Q0}_{CH}$, $H_3$, $I^{o}_{CH}$, $S_{AB}$, $L^M$ and $C_5$.

Luminance is the dominant feature (5/9), being the minimum and first quartile the most discriminative luminance features—the first feature is the first quartile of luminance in the sharp region, which is usually the coast in the image; lower IQ1 provides better aesthetic appeal, which points at the fact that the images with sharp white surf are less favoured than images with more tranquil waters; the second feature is the global minimum level of luminance. Next in importance are clarity features (2/9) with the third feature being the global contrast of the image. Note that the clash color scheme $H_3$ is also selected, which accounts for the blue-green color contrast in tropical beaches. Four out of the 9 features were calculated on contrasting regions, being sharpness and luminance the most discriminative.

Generic Aesthetic Model

The generic model is composed of 34 features, accomplishing a 5-way cross validation MSE that reduces the ratings variance by 8%, as shown in the table above. Next are listed the 14 most discriminative features in order of importance: $I_{FH}$, $I^{Q2}_{LH}$, $T_{10}$, $f_{LB}$, $L^m$, $T_{22}$, $T_{17}$, $I^{Q3}_{LH}$, $I_{AH}$, $f_{AH}$, $C_5$, $I^{Q4}_{FH}$, $f_{SH}$ and $T_8$.

It is observed that luminance is the most important feature for the generic model (6/14): the most discriminative feature is the average luminance in the sharp region, which in most of the cases is the subject of interest; the second feature is the median luminance in the bright region. Next in importance are the composition features (4/14), with the third feature being one of the golden triangles, $T_{10}$, with the intersection of the two segments—a.k.a. power point—on the right. Note that the other golden triangle template with the power point on the right, $T_8$, is also selected. It is hypothesized that the direction of writing could bias observers towards a certain region of the image, rendering certain power points more powerful than others, i.e., it would be culture dependent [33]. This might explain the preference for templates $T_{10}$ and $T_8$ in this generic model (i.e., for cultures where writing is from left to right, the eye enters the picture frame through the left side of the picture frame, travels to the center being intersected by the diagonal, which guides the eye to the power point). The other composition templates that are selected are $T_{22}$ and $T_{17}$, which are the traditional golden mean, and rule of thirds, with no orientation preference. Finally, sharpness (3/14) and chroma (1/14) features are also selected.

Eight out of the 14 features are calculated on contrasting regions, with the luminance contrasting region being the most discriminative, followed by sharpness. Since this is the combination of all other categories, the selected features were expected to be generic and make good photographic sense, as it turned out to be, i.e., good average exposure on the subject, good sharpness, and generic composition rules. Next it is compared how well the individual models perform with respect to this generic model in estimating the aesthetic value of the photographs in the dataset.

Experimental Results

Cross-Validation MSE

In order to see whether the generic feature set is competitive with the state-of-the-art, we trained a model using the same approach described in Section 5 on the data set presented in [10]. After performing the feature selection, and optimizing $v=0.45$ and $\epsilon=0.9$, it was obtained a generic model consisting of 31 features yielding a 5-way cross validation MSE of 0.55. This is comparable to what Datta et al. obtained (MSE=0.50) in [10] by using 5 polynomial terms for each of the 56 low-level features they proposed. As an exercise, a generic model was trained on a subset of our entire DPChallenge dataset—16777 images—that generated consistent results with the generic model trained on the combination of the 7 categories datasets, i.e., var=0.52, 5CV MSE=0.46.

When the 5-way cross-validation MSE for each of the categories were compared with respect to the original variance of the ratings in each data set—the same regression performance measure used in [10]—it is observed that the category-based models yield significantly better performance than the one obtained by the generic model, with an average of 121% (min=31%, max=205%) improvement over the generic model. This confirms the hypothesis that category-dependent aesthetic models improve the prediction of the aesthetic appeal of a photograph. These category-based models could, therefore, be used in an image search re-ranking scenario, similar to [25] [28].

In particular seascapes, landscape and cityscape models perform better than the other categories, which might be due to the fact that the background is more predictable—i.e., usually a large patch of sky—and also the variability of main subjects is less profound than for all other categories.

Figure 4:
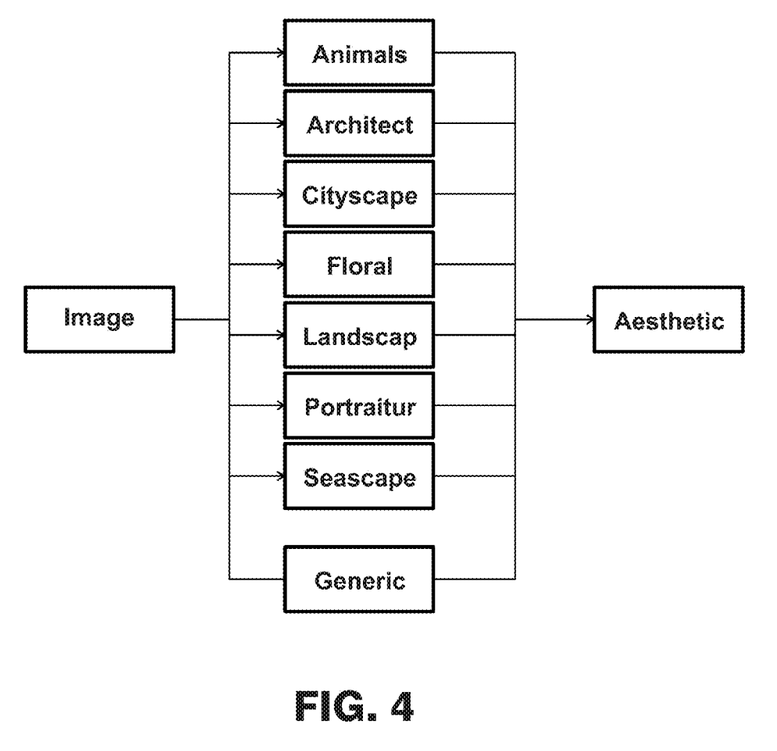
FIG. 4 shows the classification of the photographs into categories, according to an embodiment of the present invention.

The floral category obtains the lowest improvement over the generic model, and it may be due to the similarity of the features selected in both the floral and generic models, i.e., big focus on composition and exposure features. The portraiture category also yields low improvement over the generic model—in FIG. 4, out of the 5 images in the example, our category-based model actually rates the top rated image in the ground truth as the worst, and the lowest in the ground truth as the best. This poor performance may be due to the importance of the emotional message conveyed by the facial expressions in portraits, combined with artistic resources that are hard to capture in our small data set. Moreover, as Li et al. presented in [27], specific face features, such as pose, eyes closed/open, etc., would be needed in order to better capture the aesthetics of the images in this category.

In addition to the cross-validation experiments, the datasets are split into training and testing sets, learning new models from the training sets and testing on the completely unseen images from the test set. In order to preserve the ratings statistical distribution in both training and testing sets, the test set images were selected by using stratified sampling: the 300 images in each category were ordered from lowest to highest rating and placed into one of 40 bins with—approximately—the same number of images. The image with the rating closest to the median within each bin was selected. This produces a training set of 260 images, and a test set of 40 images per category. All training sets were combined to create the generic model training set with 1820 images, and a combined test set with 280 images.

Training/Testing Datasets

The aesthetics models were trained on each category's training set as described before. Each category-based model was tested on the 40 images of its category's test set. The generic aesthetics model was trained with the 1820 images on its training set and tested on each of the individual categories' test sets. The results were presented in the table above, expressed as the reduction in MSE by using the category-based models with respect to the generic model. For this particular test set it is observed that the category-based models improve performance with respect to the generic model in all categories but three: architecture, portrait and floral. However, these adverse results are probably due to the nature of the specific test set used in the experiments. The main cross validation results previously presented are more reliable, since they are the average of 50 random test set iterations—the standard deviation was also calculated, as shown in the table above.

In order to see how well these models perform in a ranking scenario—i.e., with applicability to image search—the Wilcoxon-Mann-Whitney (WMW) ranking test measure was also run, where image pairs were compared in the test set ordered by the predicted scores and assigned a 1 if the ranking was correct—i.e., the same ranking as in the ground truth ratings, and 0 otherwise. This measure is normalized by the overall number of pairs. In the table above it was presented the % improvement of the WMW test measure by using the category-based models with respect to the generic model. The results are consistent with the MSE results reported above.

From a computational perspective, even though the most computationally expensive features—e.g. the edge map, the saliency map and the sharpness map—are needed for most categories, the average number of features across category-based models is only 17.1, which, compared to the 34 features for the generic model, provides a computational advantage for the proposed approach.

Finally, note that 58% of the top selected features in the category-based models were calculated on contrasting regions of the image, with the category animals having the maximum percentage at 73%, and portraiture the minimum at 43%; in the generic model they account for 57% of the features. This result supports the hypothesis that dividing the image into contrasting regions, and calculating low-level features on these contrasting regions improves their descriptive power.

Advantages of the Invention

This is the first approach that allows for multiple aesthetic models, each of them optimized for different categories of images, allowing for an enhanced performance when compared to other approaches.

It is also presented a very complete set of low level features for image aesthetics analysis.

Finally, this new approach to analyze multiple features on contrasting regions of the image, is a completely new approach which improves performance.

Luo et al. [28] made a first attempt at capturing features in contrasting sharpness regions. They captured the ratio of luminance and the ratio of clarity between the sharp region—i.e., the subject—and the regions that were not sharp. They did not, however, capture the features themselves, only the ratios. In [36], Wong et al. calculate a set of global features, some of which (exposure, saturation, hue, blurriness, and texture details) are also computed for both the salient—i.e., foreground—and background regions. They use global features in their approach, as well as the squared differences between the features measured in the background and in the foreground. Therefore, they also only use the differences between features.

The main contributions of this invention are four-fold, namely:

1. A novel category-based approach to image aesthetic appeal prediction, which improves the results when compared to a generic model by an average, across categories, of 121%;

2. Two novel aesthetically meaningful low-level features: a) a set of exposure features to better represent the luminance histogram, which is one of the critical tools to render a highly aesthetic photograph; and (b) an image edge map-based composition feature set;

3. A new approach to measure low-level features on the image's contrasting regions that are generated using sharpness, chroma, saliency, luminance, and a measure of region appeal. In our experiments, we show that this representation increases the discriminative power of the low-level features; and 4. A publicly available image dataset composed of seven image categories, each of them with 300 images rated by at least 5 people on the DPChallenge.com website.

Figure 5:
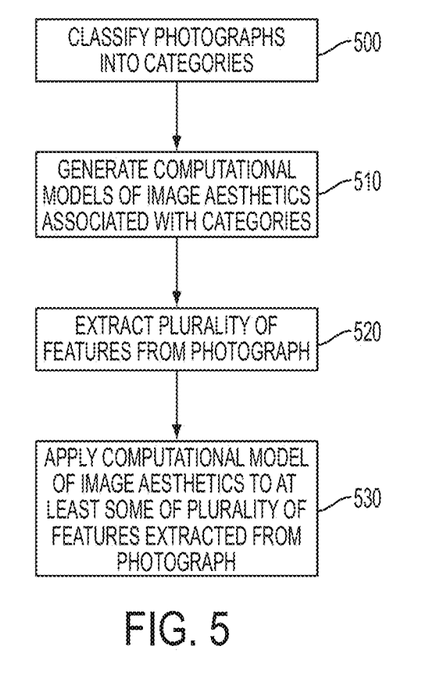
FIG. 5 is a flow diagram that illustrates a method to assess aesthetic quality of photographs, according to an embodiment.

FIG. 5 is a flow diagram that illustrates a method to assess aesthetic quality of photographs, according to an embodiment. Photographs are classified into categories in block 500, and a computational model of image aesthetics is developed for each category in block 510. A plurality of features including simplicity features, global features computed in the whole image and/or low-level features in contrasting regions of an image of said photograph are extracted from a photograph in block 520. Finally, in block 530, the computational model of image aesthetics applicable to the category of the photograph is applied to at least some of the plurality of features extracted from the photograph, in order to assess aesthetic quality of the photograph.

A person skilled in the art could introduce changes and modifications in the embodiments described without departing from the scope of the invention as it is defined in the attached claims.

ACRONYMS

HSV Hue-Saturation-Value
MSE Mean Square Error
SVM Support Vector Machine
WMW Wilcoxon-Mann-Whitney

REFERENCES

[1] P. Obrador et al., "the role of tags and image aesthetics in social image search", WSM, 2009,
[2] P. Obrador et al., "low level features for image appeal measurement", Proceedings of the SPIE, 2009.
[3] A. Adams. The Negative: Exposure and Development. Boston, 1948.
[4] S. Benzaquen. Postcolonial aesthetic experiences: thinking aesthetic categories in the face of catastrophe at the beginning of the twenty-first century. In European Congress of Aesthetics, 2010.
[5] S. Bhattacahrya, R. Sukthankar, and M. Shah. A framework for photo-quality assessment and enhancement based on visual aesthetics. In Proc. of ACM Multimedia, pages 271-280, 2010.
[6] C. Cerosaletti and A. Loui. Measuring the perceived aesthetic quality of photographic images. In Intl. Workshop on Quality of Multimedia Experience, 2009.
[7] Y. Choi and E. M. Rasmussen. User's relevance criteria in image retrieval in american history. Information Processing and Management, 38, 5:695-726, 2002.
[8] D. Cohen-Or, O. Sorkine, R. Gal, T. Leyvand, and Y.-Q. Xu. Color harmonization. ACM Transactions on Graphics, 25(3):624-630, July 2006.
[9] J. Cui, F. Wen, and T. X. Real time google and live image search reranking. In ACM Multimedia, 2008.
[10] R. Datta et al. Studying aesthetics in photographic images using a computational approach. In Proceedings of the European Conference on Computer Vision, volume 3954, pages 288-301, 2006.
[11] A. P. Dyer. A study of photographic chiaroscuro, M. A. dissertation. University of Northern Colorado, 2005.
[12] P. Felzenszwalb and D. Huttenlocher. Efficient graph-based image segmentation. International Journal of Computer Vision, 59(2):167-181, September 2004.
[13] R. Fergus et al. Learning object categories from google's image search. In ICCV, 2005.
[14] M. Freeman. The image. William Collins Sons & Co Ltd, revised edition, 1990.
[15] Y. Gao et al. Magicphotobook: designer inspired, user perfected photo albums. In Proc. Multimedia, pages 979-980. ACM, 2009.
[16] F. Gasparini and R. Schettini. Color balancing of digital photos using simple image statistics. Pattern Recognition, 37(6):1201-1217, 2004.
[17] C. Greenberg. On modernist painting. Aesthetics: A Reader in Philosophy of Arts, 1961.
[18] J. Harel, C. Koch, and P. Perona. Graph-based visual saliency. In NIPS, 2006.
[19] D. Hasler and S. Susstrunk. Measuring colourfulness in natural images. SPIE/IS&T Hum. Vis. Elec. Img., 5007: 87-95, 2003.
[20] http://photo.net/.
[21] http://www.dpchallenge.com.
[22] D. Joshi, J. Z. Wang, and J. Li. The story picturing engine—a system for automatic text illustration. ACM Transaction on Multimedia Computing, Communications and Applications, 2(1):68-89, 2006.
[23] I. Kant. The critique of judgement. Forgotten Books, forgottenbooks.org, 2008.
[24] A. Karatzoglou, A. Smola, K. Hornik, and A. Zeileis. Kernlab—an S4 package for kernel methods in R. Journal of Statistical Software, 11(9):1-20, 2004.
[25] Y. Ke, X. Tang, and F. Jing. The design of high-level features for photo quality assessment. In Proceedings of IEEE Conference on Computer Vision and Pattern Recognition, pages 419-426, 2006.
[26] L. S. Kennedy and M. Naaman. Generating diverse and representative image search results for landmarks. In Proceedings of WVVVV, pages 297-306, 2008.
[27] C. Li et al. Aesthetics quality assessment of consumer photos with faces. In Proceedings of IEEE ICIP, pages 3221-3224, 2010.
[28] Y. Luo and X. Tang. In Proc. of ECCV: Part III, pages 386-399. Springer-Verlag.
[29] P. Meer and B. Georgescu. Edge detection with embedded confidence. Transaction in Pattern Analysis and Machine Intelligence, 12(23):1351-1365, 2001.
[30] A. K. Moorty et al. Towards computational models of the visual aesthetic appeal of consumer videos. In Proc. of ECCV: Part V, pages 1-14, 2010.
[31] P. Obrador, L. Schmidt-Hackenberg, and N. Oliver. The role of image composition in image aesthetics. In Proc. of IEEE ICIP, pages 3185-3188, 2010.
[32] E. Peli. Contrast in complex images. Journal of the Optical Society of America, 7(10):2032-2040, 1990.
[33] P. Rice. Professional Techniques for Black & White Digital Photography. Amherst Media, Inc., 2005.
[34] I. Simon, N. Snavely, and S. M. Seitz. Scene summarization for online image collections. In Proceedings of the IEEE ICCV, pages 147-155, 2007.
[35] A. Torralba and A. Oliva. Statistics of natural images categories. Network: Computation in Neural Systems, 14:391-412, 2003.
[36] L. K. Wong and K. L. Low. Saliency-enhanced image aesthetics class prediction. In Proceedings of IEEE ICIP, pages 997-1000, 2009.

The invention claimed is:

1. A method to assess aesthetic quality of photographs, the method comprising:
classifying photographs into categories;
generating computational models of image aesthetics, each computational model of image aesthetics associated to one different category of said categories;
extracting a plurality of features from a photograph, said plurality of features comprising simplicity features, global features computed in the whole image and/or low-level features in contrasting regions of an image of said photograph, said contrasting regions being partitions of said image obtained by applying an image segmentation algorithm based on feature contrast to said photograph; and applying a computational model of image aesthetics, using a processor, to at least part of said plurality of features extracted from said photograph, said computational model applied according to the category of said photograph, in order to assess aesthetic quality of said photograph.

2. The method according to claim 1, further comprising generating said computational models of image aesthetics using a regression Support Vector Machine applied to a plurality of features extracted from photographs that belong to a corresponding category.

3. The method according to claim 1, further comprising generating said partitions of said image by computing elements of said feature contrast, said elements of feature contrast comprising luminance, sharpness, saliency, color chroma and a measure of region appeal.

4. The method according to claim 3, further comprising constituting a set of labeled photographs as ground truth and classifying said labeled photographs into categories, said ground truth used to train and evaluate said computational models of image aesthetics.

5. The method according to claim 4, further comprising removing frames from images of said set of labeled photographs using an automatic frame detection algorithm previous to perform a features extraction of a photograph.

6. The method according to claim 1, further comprising quantifying said simplicity features into at least one of the following four measures:
    number or regions generated by said graph-based image segmentation algorithm;
    number of segmented regions which size is larger than 5% of the image size;
    number of segmented regions which size is larger than 10% of the image size; and
    homogeneity of the background;
    wherein said homogeneity of the background is the normalized distance between the centroids of two binary maps, said two binary maps resulting of thresholding at two different levels an appeal map, said two different levels being considered at ½ and ¼ of the maximum, said appeal map being a sharpness-dependent linear combination of segmented regions of sharpness, contrast and colorfulness maps, considering said homogeneity of the background equal to 1 for images that do not generate binary maps between ⅑ and ⅔ of image size with both thresholds considered.

7. The method according to claim 1, wherein said global features are comprised in the following list: luminance, image root mean square contrast, colorfulness, color harmony and image composition.

8. The method according to claim 7, further comprising quantifying said global features into the at least one of the following measures:
    average luminance, minimum luminance, maximum luminance;
    image root mean square contrast;
    a plurality of measures of colorfulness;
    a plurality of measures of color harmony obtained by convolving a normalized Hue-histogram of an image with a plurality of templates; and
    a plurality of image composition measures obtained by intersecting an edge map of a photograph with a plurality of templates, said plurality of templates including rule of thirds, golden mean and golden triangles.

9. The method according to claim 1, further comprising applying said image segmentation algorithm to said photograph in order to generate said contrasting regions, each of said contrasting regions having assigned a value for one different contrasting feature of the following list: sharpness, luminance, chroma, appeal and saliency;
    thresholding said contrasting regions at one half the maximum level of each contrasting feature, obtaining a plurality of contrasting regions above the threshold and a plurality of contrasting regions below the threshold; and
    computing low-level features in each of said plurality of contrasting regions above the threshold and in each of said plurality of contrasting regions below the threshold.

10. The method according to claim 9, further comprising performing assignation of values to said contrasting features as follows:
    sharpness: the maximum sharpness value within a segmented region;
    luminance: the average luminance in CIELab color space over a segmented region;
    chroma: $\mu_{ab}$ calculated in a segmented region, wherein $\mu_{ab}$ is the centroid of the pixel cloud in the color plane of CIELab color space with respect to the size of said segmented region;
    appeal: average appeal calculated as a linear combination of maximum sharpness, contrast and $\mu_{ab}$ of a segmented region; and
    saliency: maximum saliency value obtained by extracting a saliency map of an image and performing a thinning operation with a circle structuring element with a diameter of a determined number of pixels selecting the maximum of a resulting saliency map on each segmented region.

11. The method according to claim 9, further comprising quantifying said low-level features into at least one of the following measures:
    sharpness, calculated as a weighted average of maximum sharpness with respect to a segmented region size;
    a plurality of luminance statistical values: mean, standard deviation, minimum, first quartile, second quartile, third quartile and maximum;
    chroma, calculated as a weighted average of $\mu_{ab}$ with respect to a segmented region size; and
    saliency, calculated as a maximum saliency with respect to a segmented region size.

12. The method according to claim 2, further comprising averaging results obtained with said regression Support Vector Machine over a number of cross-validation runs in order to validate said computational models of image aesthetics.

13. The method according to claim 1, further comprising generating a generic computational model of image aesthetics in order to assess aesthetic quality of a photograph independently of the category of said photograph.

14. The method according to claim 13, further comprising selecting part of said plurality of features using a wrapper-based approach in order to generate a computational model of image aesthetics or said generic computational model of image aesthetics, said wrapper-based approach comprising performing, for each computational model of image aesthetics and for each of said plurality of features:
    obtaining the first 5-fold cross validation mean squared error;
    keeping a set of features of said plurality of features, said set of features being over the top of a concrete percentage; and
    selecting the top performing features of said set of features in an iterative process.

15. The method according to claim 1, wherein said categories comprise animals, architecture, cityscape, floral, landscape, portraiture and seascapes.

16. The method according to claim 8, wherein said categories comprise animals, architecture, cityscape, floral, landscape, portraiture and seascapes; said method further comprising in the computational model of image aesthetics of photographs that belong to the category of animals at least one of said measures of colorfulness.

17. The method according to claim 11, wherein said categories comprise animals, architecture, cityscape, floral, landscape, portraiture and seascapes; said method further comprising in the computational model of image aesthetics of photographs that belong to the category of architecture at least a sharpness measure related to said low-level features, said sharpness measure calculated in the high saliency region of an image of said category of architecture.

18. The method according to claim 11, wherein said categories comprise animals, architecture, cityscape, floral, landscape, portraiture and seascapes; said method further comprising in the computational model of image aesthetics of photographs that belong to the category of cityscapes at least a luminance measure related to said low-level features, said luminance measure calculated in the low saliency region of an image of said category of cityscapes.

19. The method according to claim 8, wherein said categories comprise animals, architecture, cityscape, floral, landscape, portraiture and seascapes; said method further comprising in the computational model of image aesthetics of photographs that belong to the category of floral at least one of said plurality of image composition measures.

20. The method according to claim 8, wherein said categories comprise animals, architecture, cityscape, floral, landscape, portraiture and seascapes; said method further comprising in the computational model of image aesthetics of photographs that belong to the category of portraiture at least one of said plurality of measures of color harmony.

21. The method according to claim 11, wherein said categories comprise animals, architecture, cityscape, floral, landscape, portraiture and seascapes; said method further comprising in the computational model of image aesthetics of photographs that belong to the category of landscape at least a chroma measure related to said low-level features, said chroma measure calculated in the low luminance region of an image of said category of landscape.

22. The method according to claim 11, wherein said categories comprise animals, architecture, cityscape, floral, landscape, portraiture and seascapes; said method further comprising in the computational model of image aesthetics of photographs that belong to the category of seascape at least one of said plurality of luminance statistical values related to said low-level features, said at least one of said plurality of luminance statistical values calculated in the high sharp region of an image of said category of seascape.

23. The method according to claim 11, further comprising generating a generic computational model of image aesthetics in order to assess aesthetic quality of a photograph independently of the category of said photograph; said method comprising in said generic computational model of image aesthetics at least one of said plurality of luminance statistical values related to said low-level features, said at least one of said plurality of luminance statistical values calculated in the high sharp region of an image.

* * * * *